United States Patent
Klaassen et al.

(10) Patent No.: US 10,266,146 B2
(45) Date of Patent: Apr. 23, 2019

(54) SEAT BELT BUCKLE PRESENTER

(71) Applicant: TRW Automotive GmbH, Alfdorf (DE)

(72) Inventors: Jens Klaassen, Alfdorf (DE); Karl Birk, Ebersbach (DE)

(73) Assignee: TRW Automotive GmbH, Alfdorf (DE)

( * ) Notice: Subject to any disclaimer, the term of this patent is extended or adjusted under 35 U.S.C. 154(b) by 152 days.

(21) Appl. No.: 15/518,869

(22) PCT Filed: Sep. 29, 2015

(86) PCT No.: PCT/EP2015/001919
§ 371 (c)(1),
(2) Date: May 11, 2017

(87) PCT Pub. No.: WO2016/058670
PCT Pub. Date: Apr. 21, 2016

(65) Prior Publication Data
US 2017/0253214 A1    Sep. 7, 2017

(30) Foreign Application Priority Data

Oct. 17, 2014 (DE) .................. 10 2014 015 340

(51) Int. Cl.
*B60R 22/03* (2006.01)
*B60R 22/20* (2006.01)
(Continued)

(52) U.S. Cl.
CPC .............. *B60R 22/03* (2013.01); *B60R 22/20* (2013.01); *B60R 22/02* (2013.01); *B60R 22/18* (2013.01);
(Continued)

(58) Field of Classification Search
CPC ......... B60R 22/03; B60R 22/20; B60R 22/02; B60R 22/18; B60R 22/201; B60R 22/202;
(Continued)

(56) References Cited

U.S. PATENT DOCUMENTS 4,284,295 A * 8/1981 Takeda .................... B60R 22/04
180/268
5,156,417 A * 10/1992 Motozawa .............. B60R 22/03
280/802
(Continued)

FOREIGN PATENT DOCUMENTS

DE    102005021281    11/2006
WO    2015000566    1/2015

*Primary Examiner* — Keith J Frisby
(74) *Attorney, Agent, or Firm* — Tarolli, Sundheim, Covell & Tummino LLP

(57) ABSTRACT

A belt buckle feeder comprises a base (12) adapted to be fixedly attached to the vehicle and a carriage (14) being movably supported on the base (12) to which carriage a belt buckle (20) can be coupled and which can be moved by a drive arranged on the base (12). The drive includes an electric motor (26) and a worm gear comprising a worm shaft (34) which has a worm (36) as well as drive spur wheel teeth (40), with the shaft (28) of the electric motor (26) including a pinion (30) which is engaged in the drive spur wheel teeth (40) and drives the worm shaft (34).

10 Claims, 3 Drawing Sheets

(51) Int. Cl.
*B60R 22/18* (2006.01)
*B60R 22/02* (2006.01)

(52) U.S. Cl.
CPC . *B60R 2022/1806* (2013.01); *B60R 2022/208* (2013.01)

(58) Field of Classification Search
CPC ... B60R 22/203; B60R 22/205; B60R 22/206; B60R 22/04; B60R 22/06; B60R 22/08; B60R 2022/208; B60R 2022/1806; B60R 2022/207; B60R 2022/021
USPC ............ 280/801.2, 802, 803, 804; 297/469; 180/268; 701/45
See application file for complete search history.

(56) References Cited

U.S. PATENT DOCUMENTS

| | | | | |
|---|---|---|---|---|
| 5,431,446 | A * | 7/1995 | Czarnecki | B60R 22/03 280/802 |
| 7,584,997 | B2 * | 9/2009 | Bachmann | B60R 22/1953 180/268 |
| 2005/0224270 | A1 | 10/2005 | Holbein et al. | |
| 2008/0290644 | A1 * | 11/2008 | Spahn | B60R 22/03 280/806 |
| 2015/0203069 | A1 | 7/2015 | Hoika et al. | |
| 2015/0307060 | A1 * | 10/2015 | Arnold | B60R 22/03 297/469 |

* cited by examiner

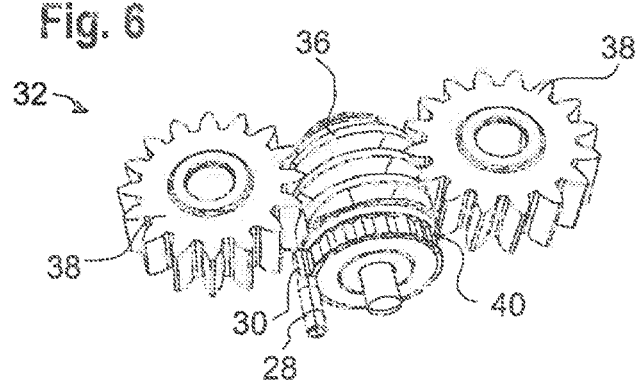
Fig. 6
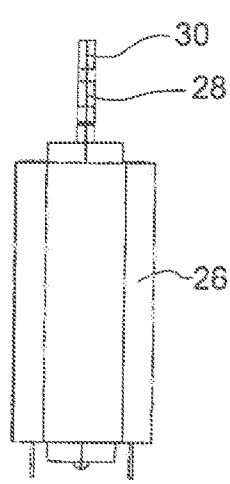
Fig. 7
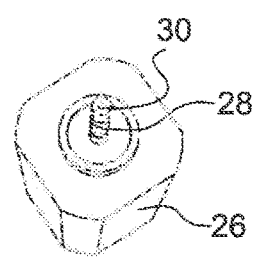
Fig. 8
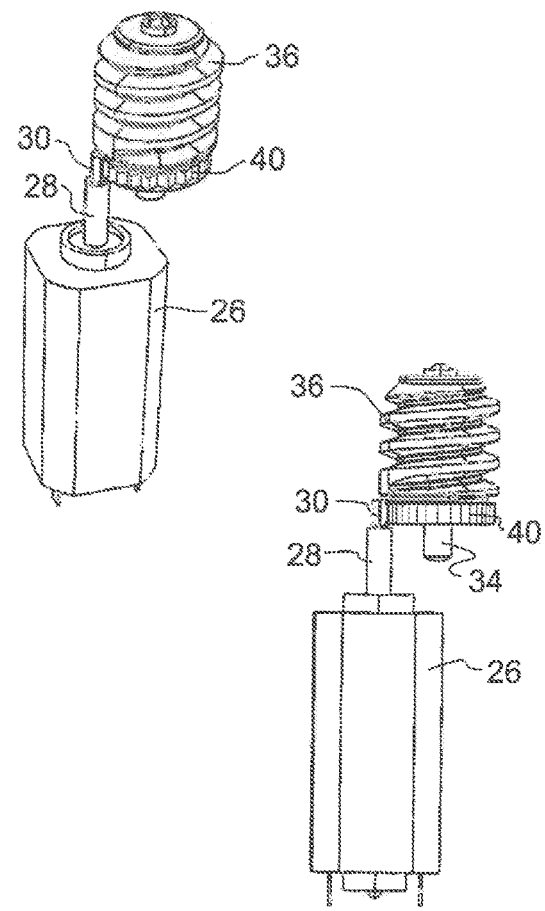
Fig. 9
Fig. 10

SEAT BELT BUCKLE PRESENTER

RELATED APPLICATIONS

This application corresponds to PCT/EP2015/001919, filed Sep. 29, 2015, which claims the benefit of German Application No. 10 2014 015 340.1, filed Oct. 17, 2014, the subject matter of which are incorporated herein by reference in their entirely.

BACKGROUND OF THE INVENTION

The invention relates to a belt buckle feeder.

Belt buckle feeders facilitate fastening and unfastening a seat belt in that the belt buckle is reversibly moved, by means of a drive, from a retracted position in which it is no obstacle to the vehicle occupant during normal driving operation to an extended position in which the vehicle occupant may easily reach the belt buckle.

SUMMARY OF THE INVENTION

It is the object of the invention to provide a compact and cost-efficient belt buckle feeder.

In accordance with the invention, a belt buckle feeder is provided comprising a base adapted to be fixedly attached to the vehicle and a carriage supported to be movable on the base to which a belt buckle can be coupled and which can be moved by a drive arranged on the base. The drive includes an electric motor and a worm gear comprising a worm gear shaft having a worm shaft as well as drive spur wheel teeth, the shaft of the electric motor including a pinion which is engaged in the drive spur wheel teeth and drives the worm shaft. In this way, a very compact force transmission from the electric motor to the worm gear moving the carriage is facilitated. Above all, constructed space in the axial direction, i.e. in the moving direction, can thus be saved. The drive spur wheel teeth are formed adjacent to the worm or slightly spaced apart therefrom but concentrically thereto.

The worm gear may be designed, in an especially advantageous manner, to be self-locking, especially under tensile load.

Preferably, the drive spur wheel teeth are arranged directly adjacent to the worm so as to minimize the constructed space in the axial direction.

The drive spur wheel teeth may be provided on spur wheel attached to the worm shaft. It is also possible, however, to form the drive spur wheel teeth integrally with the worm shaft or the worm. The drive spur wheel teeth may be a straight gearing or a helical gearing, this is equally applicable to the teeth of the pinion.

The diameter of the pinion may approximately correspond to the diameter of the shaft of the electric motor or may be smaller than the latter. This allows especially for forming the pinion directly on the shaft of the electric motor and integrally with said shaft. Then the use of a further gearwheel as a separate component can be dispensed with. The desired transmission for the drive of the worm is defined by the diameter of the drive spur wheel teeth.

It is favorable when the worm shaft is located on a longitudinal axis of the base, while the electric motor is arranged offset against the longitudinal axis. In this way, the worm gear can be designed symmetrically with respect to the longitudinal axis, thus permitting the use of same parts and simplifying the design of the belt buckle feeder.

The carriage preferably comprises at least one gear rack section into which at least one spur wheel of the worm gear driven by the worm engages, the spur wheel acting as a worm gear so as to move the carriage.

In a preferred embodiment, two opposite gear rack sections are provided, and two spur wheels facing each other are provided, each meshing with the worm and each engaging in its dedicated gear rack section. Such symmetric arrangement of the driven spur wheels ensures uniform and low-noise movement of the carriage along the base.

The base may include an elongate housing rectangular in cross-section comprising two opposite plates in which the spur wheels are supported and two opposite side walls from which the spur wheels are laterally protruding. This design, too, serves for the compact structure of the belt buckle feeder.

The carriage advantageously surrounds the base at least in part, wherein the gear rack sections are arranged in parallel to the side walls so that the spur wheels are adapted to be engage in the gear rack sections.

Preferably, the base includes a seat for the electric motor provided, for example, between the opposite plates, wherein one or both of the plates may have recesses through which the electric motor protrudes.

Furthermore, the base advantageously comprises a bearing for the shaft of the electric motor, the worm shaft and the spur wheel(s) of the worm gear, which further minimizes the number of the individual components required.

BRIEF DESCRIPTION OF THE DRAWINGS

Hereinafter the invention shall be illustrated in detail by way of an embodiment with reference to the attached drawings, wherein:

FIG. 6 shows a schematic perspective representation of components of the drive of the belt buckle feeder from FIG. 1;

FIGS. 7 and 8 show views of the electric motor of the drive of the belt buckle feeder from FIG. 1; and FIGS. 9 and 10 show various views of the electric motor, the pinion and the worm shaft of the drive of the belt buckle feeder from FIG. 1.

DESCRIPTION

Figures 1, 2:
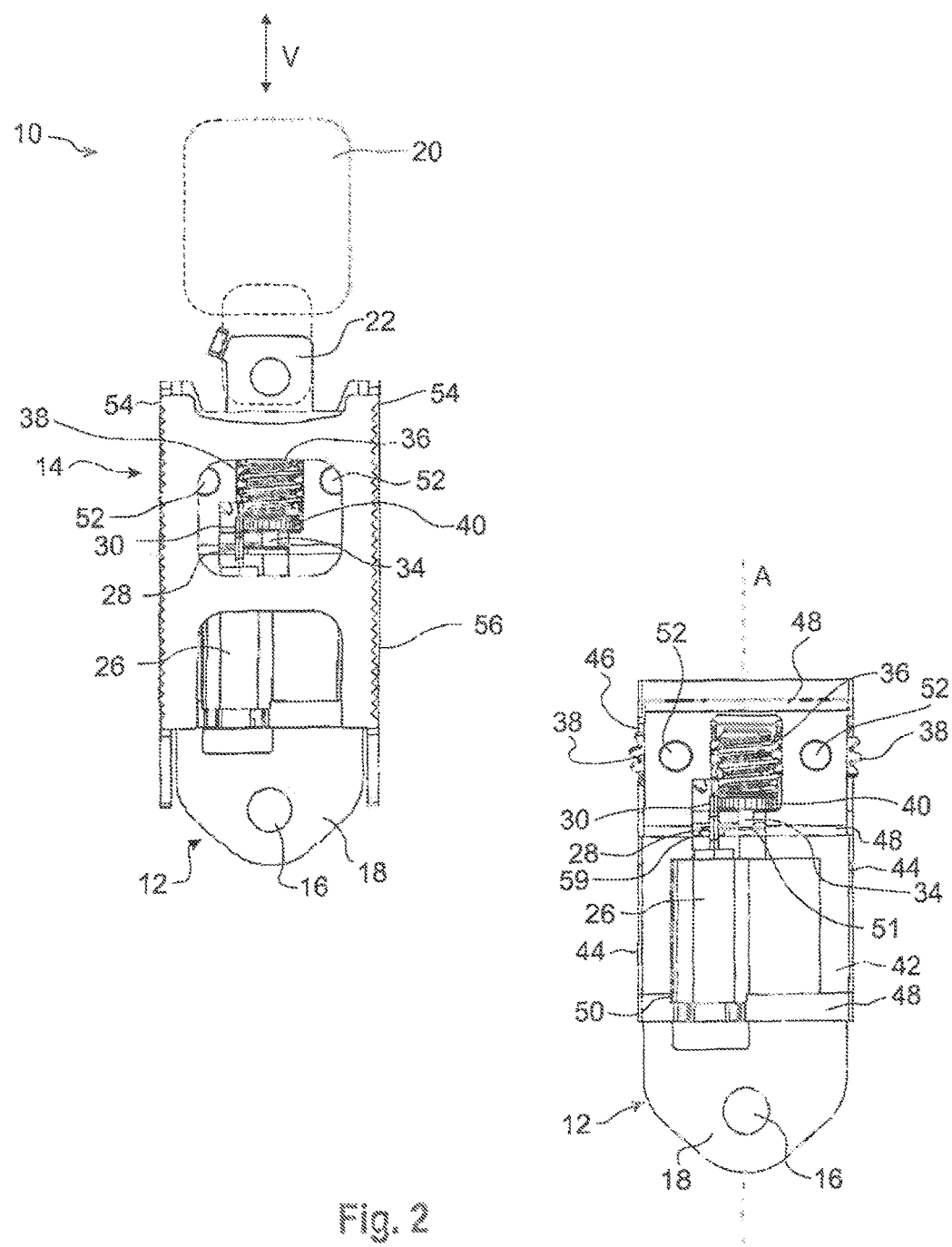
FIG. 1 shows a schematic representation of a belt buckle feeder according to the invention in a front view.
FIG. 2 shows the belt buckle feeder from FIG. 1 in a rear view.
Figure 3:
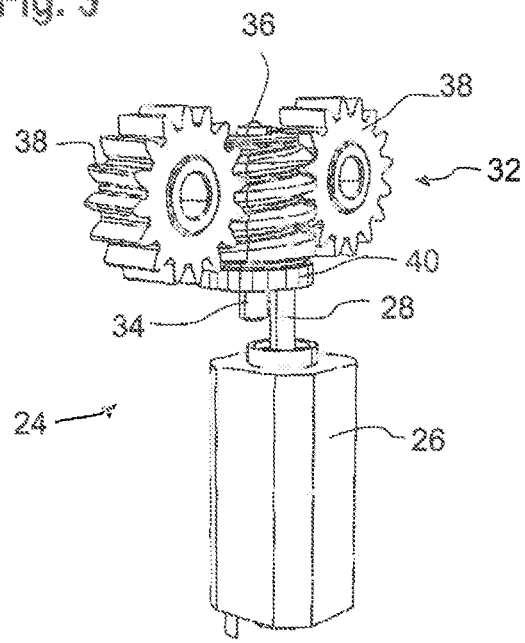
FIGS. 3 to 5 show various views of a drive of the belt buckle feeder from FIG. 1.
Figure 4:
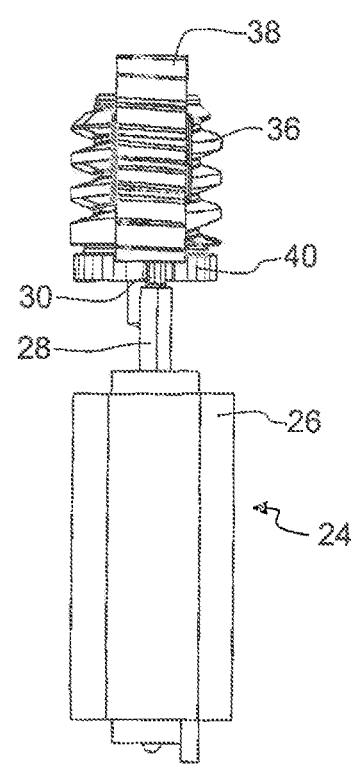
Figure 5:
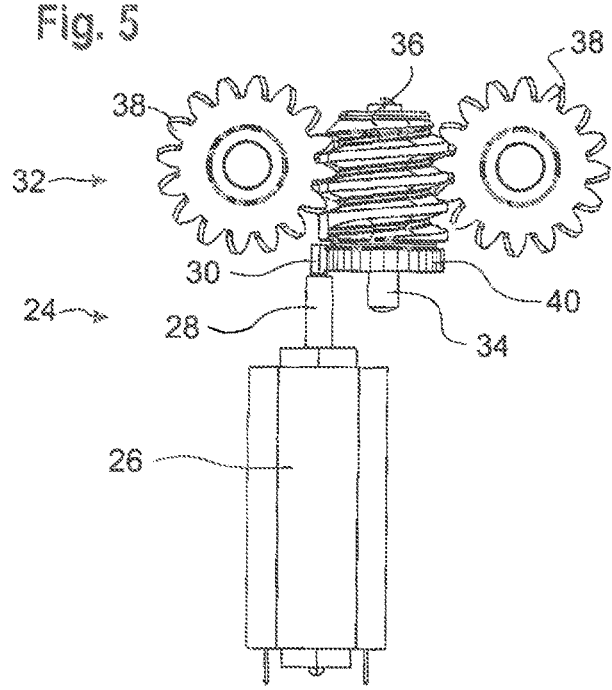

FIG. 1 illustrates a belt buckle feeder 10 comprising a rigid base 12 adapted to be tightly secured to the vehicle and a carriage 14 being movably supported on the base 12 and partly encompassing the base 12. The traveling direction V is located along a longitudinal axis A of the base 12.

The belt buckle feeder 10 in this case is secured to the vehicle by means of a securing eye 16 in a rear plate 18 of the base 12.

On the carriage 14 a belt buckle 20 (indicated in FIG. 1) can be fixed for example by means of a projection 22 including an appropriate fitting opening.

The carriage 14 is reversibly movable by means of a drive 24 along the base 12 in the traveling direction V so that the belt buckle 20 can be moved from a retracted position shown in FIG. 1 in which the belt buckle 20 is provided during normal driving operation of the vehicle to an extended position where it is conveniently accessible for the vehicle occupant for fastening and unfastening the seat belt.

The driving energy is supplied by an electric motor 26 the shaft 28 of which supports a pinion 30 (cf. also FIGS. 3 to 10). Via the pinion 30 the electric motor 26 drives a worm gear 32 comprising a worm shaft 34 having a worm 36 disposed thereon as well as two spur wheels 38 meshing with the worm 36 on opposite sides. Directly adjacent to the worm 36, drive spur wheel teeth 40 which are formed, for example, on a spur wheel attached to the worm shaft 34 are provided on the worm shaft 34. Said drive spur wheel teeth 40 are engaged in the pinion 30 so that the worm gear 32 can be driven by means of the electric motor 26.

The worm shaft 34 and the shaft 28 of the electric motor 26 are arranged to be laterally offset against each other but in parallel to each other.

The two spur wheels 38 are located in a plane, with the axes thereof being oriented perpendicularly to the shaft 28 and to the worm shaft 34.

The pinion 30 is formed integrally with the shaft 28 of the electric motor 26 in this case, but it might as well be a gearwheel attached to the shaft 28. The pinion 30 in this case has approximately the diameter of the shaft 28 of the electric motor 28 or is designed to be slightly smaller than said shaft. The diameter of the drive spur wheel teeth 40 is accordingly selected so that the desired transmission ratio of the speeds for driving the spur wheels 38 is reached.

The base 12 in this example has an elongate housing rectangular in cross-section which comprises, apart from the rear plate 16, a front plate 42 arranged in parallel thereto as well as two opposite side walls 44 connecting the rear plate 16 and the front plate 42. Each of the side walls 44 includes a recess 46 through which the spur wheels 38 are laterally protruding.

Moreover, plural cross webs 48 are provided between the two side walls 44.

In the base 12 a seat 50 for the electric motor 26 is formed, wherein the front plate 42 is open-worked in the area of the seat 50 so that the electric motor 26 may protrude through the front plate 42.

The seat 50 of the electric motor 26 is arranged to be laterally offset against the longitudinal axis A of the base 12, whereas the worm shaft 34 is located on the longitudinal axis A so that the worm gear 32 is arranged symmetrically relative to the longitudinal axis A.

In the central one of the cross webs 48 in FIG. 2 a passage comprising a bearing 59 for the shaft 28 of the electric motor as well as a bearing 51 for an axial end of the worm shaft 34 is provided. The second axial end of the worm shaft 34 is supported in this case in the upper (in FIG. 2) cross web 48 of the base 12.

The front plate 42 as well as the rear plate 16 include bearing points 52 for the axles of the spur wheels 38 so that they, too, are supported on the base 12. It is possible to fix the spur wheels 38 on a separate bearing plate which will then be inserted in the base 12 (not shown).

The carriage 14 comprises two side walls 54 arranged in parallel to the side walls 44 of the base 12. On each of the inner surfaces facing the side wall 44 of the base 12 of each of the side walls 54 a gear rack section 56 is formed in which the teeth of the spur wheels 38 of the worm gear 32 engage (as indicated in FIG. 1). When the spur wheels 38 are made to rotate, they move the carriage 14 along the traveling direction V in the direction of the extended position and the retracted position.

The invention claimed is:

1. A belt buckle feeder comprising a base (12) adapted to be fixedly attached to a vehicle and a carriage (14) movably supported on the base (12) to which carriage a belt buckle (20) can be coupled and which can be moved by a drive (24) arranged on the base (12), wherein the drive (24) includes an electric motor (26) and a worm gear (32) having a worm shaft (34) which includes a worm (36) as well as drive spur wheel teeth (40), with the shaft (28) of the electric motor (26) including a pinion (30) which is engaged in the drive spur wheel teeth (40) and drives the worm shaft (34).

2. The belt buckle feeder according to claim 1, wherein the drive spur wheel teeth (40) are arranged to be directly adjacent to the worm (36).

3. The belt buckle feeder according to claim 1, wherein the diameter of the pinion (30) is approximately corresponding to the diameter of the shaft (28) of the electric motor (26) or is smaller than the latter.

4. The belt buckle feeder according to claim 1, wherein the pinion (30) is formed integrally with the shaft (28) of the electric motor (26).

5. The belt buckle feeder according to claim 1, wherein the worm shaft (34) is located on a longitudinal axis (A) of the base (12), whereas the electric motor (26) is offset against the longitudinal axis (A).

6. The belt buckle feeder according to claim 1, wherein the carriage (14) includes at least one gear rack section (56) into which at least one spur wheel (38) of the worm gear (32) driven by the worm (36) engages so as to move the carriage (14).

7. The belt buckle feeder according to claim 6, wherein two opposite gear rack sections (56) are provided and that two spur wheels (38) facing each other are provided each of which meshes with the worm (36) and each of which is engaged in its dedicated gear rack section (56).

8. The belt buckle feeder according to claim 6, wherein the base (12) has an elongate housing rectangular in cross-section comprising two opposite plates (16, 42) in which the spur wheels (38) are supported and comprising two opposite side walls (44) from which the spur wheels (36) are laterally protruding.

9. The belt buckle feeder according to claim 1, wherein the base (12) includes a seat (50) for the electric motor (26).

10. The belt buckle feeder according to claim 1, wherein the base (12) includes a bearing (59, 51) for the shaft (28) of the electric motor (26), the worm shaft (34) and/or the spur wheel(s) (38) of the worm gear (32).

* * * * *